United States Patent [19]

Pogoda

[11] 4,274,887

[45] Jun. 23, 1981

[54] LACQUER COATED METAL SURFACE

[75] Inventor: Dieter Pogoda, Hamburg, Fed. Rep. of Germany

[73] Assignee: Messerschmitt-Boelkow-Blohm Gesellschaft mit beschraenkter Haftung, Munich, Fed. Rep. of Germany

[21] Appl. No.: 68,056

[22] Filed: Aug. 20, 1979

Related U.S. Application Data

[63] Continuation-in-part of Ser. No. 680,903, Apr. 28, 1976.

[30] Foreign Application Priority Data

May 2, 1975 [DE] Fed. Rep. of Germany ....... 2519559

[51] Int. Cl.³ ........................ B32B 15/20; B32B 15/08

[52] U.S. Cl. ................................ 148/31.5; 428/212; 428/416; 428/423.5

[58] Field of Search .................... 428/212, 416, 423.5; 148/31.5

[56] References Cited

U.S. PATENT DOCUMENTS

| | | | |
|---|---|---|---|
| 3,544,349 | 12/1970 | Isaksen et al. | 427/156 |
| 3,625,742 | 12/1971 | Baldwin | 428/416 |

*Primary Examiner*—James R. Hoffman
*Attorney, Agent, or Firm*—W. G. Fasse; D. F. Gould

[57] ABSTRACT

This protective coating on a metal surface, especially for aircraft bodies and the like, has, on a pickled metal surface which may be anodized in addition to being pickled, a bonding primer layer and a polyurethane primer layer, an intermediate layer which is easily dissolved and a top layer forming a finish coat on said intermediate layer which protects the primer layers when the top coat is removed for a new paint job.

14 Claims, 1 Drawing Figure

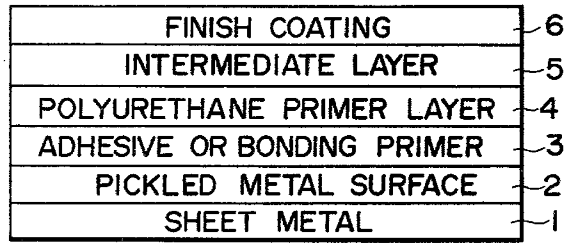
FINISH COATING
6
INTERMEDIATE LAYER
5
POLYURETHANE PRIMER LAYER
4
ADHESIVE OR BONDING PRIMER
3
PICKLED METAL SURFACE
2
SHEET METAL
1

LACQUER COATED METAL SURFACE

CROSS-REFERENCE TO RELATED APPLICATIONS

This application is a continuation-in-part application of my copending application Ser. No.: 680,903; filed on Apr. 28, 1976.

BACKGROUND OF THE INVENTION

The present invention relates to lacquer coatings on metal surfaces, especially aircraft bodies or the like.

The outer lacquer coating on an aircraft is normally applied after the final assembly. Conventionally, a so-called wash primer is applied along with a top coating of lacquer or paint. It is also known to use one or several primer coatings between the wash primer and the top coating. Aircrafts are generally repainted after several years, either to improve their appearance or to change their appearance. Heretofore, it was necessary to completely remove the previous paint coat and primer down to the bare metal surface prior to a new paint job. A mere removal of the top coating is not possible in prior art paint and/or lacquer coating. Due to the complete paint removal heretofore required, it is normally unavoidable that the original metal surface treatment is damaged or even completely destroyed, whereby the corrosion protection afforded by the second lacquer coating or paint job is substantially diminished, especially since the so-called filiform-corrosion can be much more effective where the original metal treatment is penetrated or completely removed. Further, it is required that the paint job on modern commercial aircraft is resistant to non-combustible hydraulic fluids. Such hydraulic fluids usually comprise sulphuric acid esters and the so-called wash primer is not resistant or proof against such esters whereby lacquer layers already mechanically damaged may further be damaged due to a creeping action.

The application of a primer which is resistant against sulphuric acid esters on the individual components of the aircraft would have the great advantage that an intimate bonding would be achieved between the primer and the metal surface. This method would also permit the heat treatment of the primer directly on the individual components. In addition, it would be possible to achieve the best metal surface treatment for each individual component whereby a good bond could be achieved between the top coating and the primer. Such good bond in turn would substantially eliminate the so-called filliform-corrosion. Moreover, corrosion due to creeping action at points where sheet metal sections overlap each other or along edges and abutments would be almost completely eliminated. Aircraft manufactured in this manner could be painted with the sulphuric acid ester resistant top coat or lacquer after the final assembly. However, such method of applying the paint coating by priming each individual part separately would prevent the removal of the paint coating, even after several years. Even the use of etching means, such as phenol and cresol containing etching means which are very toxic and hence undesirable from an environmental protection point of view would not be suitable to completely remove such a paint system as described above. Furthermore, the removal by sanding is not only uneconomical, it also destroys the metal surface treatment, such as yellow chromizing or anodizing. Another disadvantage of removing old paint coatings by sanding is seen in that the plating itself could be sanded through.

OBJECTS OF THE INVENTION

In view of the foregoing, it is the aim of the invention to achieve the following objects, singly or in combination:

to remove the drawbacks of the prior art as described above, more specifically to provide a protective coating including a top finish coating such as a layer which is easily removed prior to a second paint job without damaging the original priming:

to provide an intermediate layer between a protective primer layer and the top finish coat which is inert against any etching means which might be used for removing the top coat;

to employ an intermediate layer of such a nature that the solvents used for removing the intermediate layer will not attack the primer coat and will also not affect the metal surface which may be pickled or pickled and anodized; and to assure an intimate long lasting bond between the intermediate layer and the primer coat on the one hand and the intermediate layer and the top coat on the other hand.

SUMMARY OF THE INVENTION

According to the invention there is provided a paint coating for a metal surface which is characterized by an intermediate layer between a first protective polyurethane primer coating and the top finish coating. An adhesive or bonding coating forming a second primer layer is located between the protective polyurethane primer coating or layer and the metal surface which is prepared by pickling or by pickling and anodizing. The two primer coats or layers in combination with the intermediate layer permit the easy removal of the top finish coating only and provide a durable protection for the prepared metal surface itself.

According to this preferred embodiment, the so-called bonding primer tenaciously secures the polyurethane primer to the anodized or chromized metal surface, such as of the body of an aircraft or the like, whereby a good mechanical protection is provided for the metal surface. On the other hand, it has been found that the polyurethane primer in combination with the intermediate layer greatly enhances the removability of the top coating while simultaneously assuring a superior quality coating system as far as durability and protection are concerned. As mentioned, on top of this double primer, there is applied the intermediate layer, for example, by spraying a non-cross-linked polyamide onto the polyurethane protective primer. The top coating could then be a polyurethane lacquer.

It is considered surprising that a highly durable coating system which requires repainting jobs less frequently than prior art coating systems, is simultaneously so easy to remove. Heretofore, durability and ease of removal have been incompatible with each other.

BRIEF DESCRIPTION OF THE DRAWING

In order that the invention may be clearly understood, it will now be described, by way of example, with reference to the accompanying single FIGURE, which illustrates a sectional view through one example of a paint job according to the invention.

DETAILED DESCRIPTION OF PREFERRED EXAMPLE EMBODIMENTS AND OF THE BEST MODE OF THE PRESENT INVENTION

The sheet metal 1 is to be painted. The surface 2 of the sheet metal 1 may be pre-treated, for example, by pickling or pickling and anodizing. Layer 3 is an adhesive primer operating as a bonding primer for layer 4 which is a protective polyurethane primer. These primers are preferably applied individually on each component part. An intermediate layer 5, according to the invention, is a material which is inert against any solvent for a later removing of the top finish coating 6. Such intermediate inert layer may, for example, be a non cross-linked polyamide. The top finish coating 6, may be a lacquer such as a polyurethane lacquer. The thickness of the layers shown is rather exaggerated.

According to the invention, the second paint job is performed as follows: only the top layer or coating 6 is removed, preferably with an etchant that is not objectionable from an environment point of view. The intermediate layer 5 facilitates the removal of the top coating 6, because it prevents a penetration of the etchant into the primer 4.

After removal of the top coating 6, the intermediate layer 5 may also be removed if desired, for example, with a solvent such as an alcohol. The original polyurethane primer 4 is not affected at all by the removal of the intermediate layer 5 and its good bond to the surface 2 is assured by the bonding primer 3 even after the application of the second paint job.

This feature of the invention has the advantage that time and costs are saved which is especially important with aircraft, the down-time of which must be minimized.

If the intermediate layer 5 should have been removed, a new intermediate layer will be applied to completely cover the polyurethane primer 4. This completely covering may be facilitated by using a color in the intermediate layer 5 which differs from the color of the primer in a well visible manner. Another advantage of distinctly coloring the intermediate layer 5 is seen in that the subsequent spraying of the intermediate layer is easy to check at a later time. Thereafter, a new top coating 6, such as a polyurethane lacquer is applied. Such a lacquer has a good chemical resistivity as well as a good bond to the intermediate layer 5. In spite of this bond and surprisingly, it is relatively easy and hence economical to remove the top coating at a later time, if necessary.

Summarizing, advantages of the invention are seen in that it facilitates not only the second paint job, even it it involves several layers of paints, but also that it provides a high quality underpaint which is not removed by the work necessary for the second paint job. This is especially important in connection with metal surfaces, because the pre-treatment steps which are necessary prior to a second paint job do not change in any way the quality of the original primer job and do not damage any surface treatment.

A specific example of the invention would involve the following steps: The individual component element is pickled and then yellow chromatized and the bonding primer coat 3 is applied prior to any assembly. Still prior to assemblying, the protective primer 4 is applied whereby a heat treatment may also be involved. Thereafter, the individual elements are mounted and subsequent to the final assembly of the aircraft or the like, the following steps are performed: light sanding and cleaning of the protective polyurethane primer 4, spraying of an intermediate layer 5 of lacquer or the like and thereafter spraying with the top coating lacquer. When later a second paint job is required, the top coating is removed, preferably with an etchant not objectionable from an environmental point of view. The following etchants would be suitable: DO 317 or N 53509 produced by the Wiederhold Company; Herbol FL 7040 produced by BASE-Lackchemie could also be used. Other etchants such as Titanine Nr. 20 of the company Titanine Ltd. or Scalpex G5 of the company S.C.A.L.P. would also be suitable. After the etching or pickling of the top layer lacquer, the intermediate layer is removed by means of an alcohol solvent, such as N 38734, whereby the polyurethane primer 4 is again exposed. Thereafter, said intermediate layer and a top layer will be sprayed.

The term "chromatized" as used herein is described in a book by F. Toedt entitled: "Korrosion and Korrosionsschutz" (Corrosion and Protection Against Corrosion), Publisher: Walter de Gruyter, Berlin 1961 at page 539. The term refers to a chromation process in an immersion bath containing chromic acid or dichromate with an acid. The process results in a greenish-yellow layer of a basic chromate having a thickness of approximately 0.5–1 μm. In the case of zinc, for instance, the composition of such a chromate lies theoretically between the two extremes 4Zno, $4CrO_3$, $K_2O$, $3H_2O$ and 3ZnO, $CrO_3$, $3H_2O$.

The term "filiform corrosion" describes irregularity directed corrosion threads extending between a base material and a protective layer. The corrosion attacks starts from an endangered point, e.g., a slag occlusion or a broken varnish skin.

The present bonding or adhesive primer forming layer 3 may, for example, comprise a combination of epoxy resins with phenolic resins which are preferably heat cured. These resins are formed, inter alia, by the reaction of the initial epoxy product epichlorohydrin with bisphenolene. Due to terminal ethylene oxide groups it is possible to subject such resins available in various polymerization stages to cross-linking reactions, whereby additions of uric and phenolic resins are possible. These bonding primers generally contain corrosion inhibitors such as chromates, see page 664 of the above mentioned book by Toedt.

The finish coating 6 may be a polyurethane based lacquer. Systems of this kind are obtained by reaction between polyisocyanates and suitable partners containing hydroxyl groups, usually condensation products of polycarbonic acids with polyalcohols which permit modifications in a very wide range. It is thus possible to produce all the graduations of a cross-linkage and to achieve effects as is the case with the films of fatty drying oils. The two components of these varnishes are mixed prior to application. Curing takes place by cross-linking. The polyurethane protection primer layer 4 is obtained in the same manner with the addition of extenders and corrosion inhibitors such as strontium chromate, zinc chromate, or barium chromate.

The intermediate layer 5 in the form of a non-cross-linked polyamide comprises polyamides having chain molecules, so-called linear polyamides which are produced by polycondensation of caprolactam. Preferably, mixtures of aromatic hydrocarbons and alcohols are used as solvents.

When removing the top finish layer for a new paint job preferably lacquer removers are used which are free from both phenol and cresol, the utilization of which entails neither health risks nor does it necessitate expensive preventive measures aimed at keeping air and sewage water free from pollution.

The intermediate layer 5 may be dyed by means of organic or inorganic pigments or with the help of lacquer soluble organic dyes (transparent lacquer).

The new covering layer, may again be, e.g., polyurethane lacquer as described above.

In the illustration the metal surface 2 is called a "pickled" surface. However, it is intended not to limit the protection to this example since the surface may be pickled or pickled and anodized or chromatized as described above.

A preferred pickling bath solution may comprise 27.3% by weight of concentrated sulphuric acid having a specific gravity of 1.82; 7.5% by weight of sodium bichromate, and 65% by weight of water. Instead of the sodium bichromate, potassium bichromate may be used. The bath temperature should be about 60° to 65° C. and the treatment should be completed after about 20 to 30 minutes.

The metal layer 1 is preferably of aluminium or aluminium alloys which may be yellow chromatized to form the layer 2. The bonding primer layer 3 may also be a polyurethane containing hydroxyl groups. In other words the binding agent comprises polyester or polyether with free hydroxyl groups. The hardener comprises polyisocyanate which cross-links with the binding agents through addition reactions. A mixture of benzol hydrocarbons and ester serves as solvent, preferably in a ratio of 1:1. In addition, primary layer 3 may contain extenders and corrosion inhibitors as well as chromates.

The intermediate layer 5 comprises, as mentioned, non-cross-linked polyamides produced by polycondensation of caprolactam. Mixtures of aromatic hydrocarbons and alcohols serve as solvents. The intermediate layer 5 may include 6–14% polyamide resin and 4–12% pigments by weight. The pigment may be titanium dioxide.

The finish coating or layer 6 is preferably a polyurethane varnish including a binding agent, a hardener and a solvent and if so required, dyed with pigments.

Although the invention has been described with reference to specific example embodiments, it is to be understood, that it is intended to cover all modifications and equivalents within the scope of the appended claims.

What is claimed is:

1. A protected sheet metal comprising a pickled surface, an adhesive primer coating on said pickled surface, a polyurethane primer layer on said adhesive primer coating, an intermediate layer on said polyurethane primer layer and a finish coating on said intermediate layer, said intermediate layer being removable by a process which does not affect said polyurethane primer layer, said finish coating being removable by a process which does not affect said intermediate layer, thereby facilitating the renewal solely of the finish coating and protecting said polyurethane primer layer and the surface below the polyurethane primer layer.

2. The sheet metal of claim 1, wherein said intermediate layer is solvable in an evaporable solvent.

3. The sheet metal of claim 2, wherein said intermediate layer is a non-cross-linked polyamide which is easily removable by a suitable solvent for such polyamide.

4. The sheet metal of claim 1, wherein the intermediate layer has a different color relative to the polyurethane primer layer.

5. The sheet metal of claim 1, wherein the intermediate layer has a different color relative to the finish coating.

6. The sheet metal of claim 1, wherein said pickled surface of the sheet metal is also anodized.

7. A lacquer coated sheet metal comprising a pickled surface, an adhesive primer on said pickled surface, a heat cured substantially insoluble polyurethane primer on said adhesive primer, an intermediate layer of non-cross-linked polyamide soluble in alcohol on said polyurethane primer, and an external polyurethane base lacquer layer on said intermediate layer.

8. The lacquer coated sheet metal of claim 7, wherein said pickled metal surface is chromatized, said adhesive primer being coated on said chromatized, pickled surface.

9. The lacquer coated sheet metal of claim 7, wherein said adhesive primer is a bonding primer between said polyurethane primer and said pickled metal surface.

10. The lacquer coated sheet metal of claim 9, wherein said bonding primer comprises an epoxy resin and a phenolic resin.

11. The lacquer coated sheet metal of claim 9, wherein said bonding primer further comprises a corrosion inhibitor.

12. The lacquer coated sheet metal of claim 9, wherein said intermediate layer comprises 4 to 12% of a pigment.

13. The lacquer coated sheet metal of claim 7, wherein said pickled surface has been anodized in the presence of a 4 to 10%, by weight, chromic acid, wherein said adhesive primer comprises an epoxy-phenolic resin compound, wherein said heat cured substantially insoluble polyurethane primer comprises the following components: polyurethane from 40% by weight to 60% by weight, extender materials present within the range from 10% by weight to 20% by weight, pigment present within the range from 10% by weight to 20% by weight, and a corrosion inhibitor present within the range from 10% by weight to 20% by weight, wherein said non-cross-linked polyamide of the intermediate layer is a linear polyamide produced by polycondensation of caprolactam, and wherein said polyurethane base lacquer is derived by reaction between polyisocyanates and condensation products of polycarbonic acids with polyalcohols.

14. The lacquer coated sheet metal of claim 13, wherein said extender materials are mica, wherein said pigment is titanium dioxide, and wherein said corrosion inhibitor is strontium chromate.

* * * * *